United States Patent
Yabe et al.

(10) Patent No.: US 9,960,927 B2
(45) Date of Patent: May 1, 2018

(54) HOME DEVICE, REMOTE CONTROL SYSTEM AND PROGRAM

(71) Applicant: Mitsubishi Electric Corporation, Tokyo (JP)

(72) Inventors: Masaaki Yabe, Tokyo (JP); Ichiro Maruyama, Tokyo (JP); Satoshi Minezawa, Tokyo (JP); Toshiaki Yoshikawa, Tokyo (JP); Hirotoshi Yano, Tokyo (JP); Daisuke Iizawa, Tokyo (JP); Kenichiro Tanaka, Tokyo (JP); Takashi Ogino, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 177 days.

(21) Appl. No.: 14/888,738

(22) PCT Filed: May 16, 2014

(86) PCT No.: PCT/JP2014/063084
§ 371 (c)(1),
(2) Date: Nov. 3, 2015

(87) PCT Pub. No.: WO2014/188976
PCT Pub. Date: Nov. 27, 2014

(65) Prior Publication Data
US 2016/0056970 A1   Feb. 25, 2016

(30) Foreign Application Priority Data

May 23, 2013  (JP) ................................ 2013-109057

(51) Int. Cl.
*H04L 12/28* (2006.01)
*G08C 17/00* (2006.01)

(52) U.S. Cl.
CPC .......... *H04L 12/2809* (2013.01); *G08C 17/00* (2013.01); *H04L 12/2818* (2013.01)

(58) Field of Classification Search
CPC .. G08C 17/00; H04L 12/2818; H04L 12/2809
See application file for complete search history.

(56) References Cited

U.S. PATENT DOCUMENTS

| | | | |
|---|---|---|---|
| 8,699,501 B2 * | 4/2014 | Shin ................... | H04L 12/2818 370/401 |
| 9,614,964 B2 * | 4/2017 | Stepanian .......... | H04M 3/5235 |

(Continued)

FOREIGN PATENT DOCUMENTS

| | | |
|---|---|---|
| JP | 2007-041907 A | 2/2007 |
| JP | 2007-304683 A | 11/2007 |

(Continued)

OTHER PUBLICATIONS

International Search Report of the International Searching Authority dated Jul. 15, 2014 for the corresponding international application No. PCT/JP2014/063084 (and English translation).

(Continued)

*Primary Examiner* — Oanh Duong
(74) *Attorney, Agent, or Firm* — Posz Law Group, PLC

(57) ABSTRACT

A controller of an in-home controller receives, via a terminal communicator, input data related to a manager registration transmitted from a terminal device. The controller performs a manager registration based on the received input data. Also, the controller generates user registration request data containing a user ID and a password extracted from the received input data, a controller ID read from data storage. The controller transmits the generated user registration request data to an external server via a wide-area communicator.

8 Claims, 5 Drawing Sheets

(56) References Cited

U.S. PATENT DOCUMENTS

| | | | |
|---|---|---|---|
| 9,791,838 B2* | 10/2017 | Park | G05B 15/02 |
| 2002/0147791 A1* | 10/2002 | Choi | H04L 12/2803 |
| | | | 709/217 |
| 2004/0150546 A1* | 8/2004 | Choi | H04B 1/202 |
| | | | 341/176 |
| 2004/0152460 A1* | 8/2004 | La | H04L 12/2803 |
| | | | 455/426.1 |
| 2006/0238372 A1* | 10/2006 | Jung | H04H 60/13 |
| | | | 340/12.29 |
| 2007/0067431 A1* | 3/2007 | Yoshihara | H04L 12/2803 |
| | | | 709/223 |
| 2009/0178128 A1* | 7/2009 | Chiba | H04L 67/125 |
| | | | 726/7 |
| 2014/0067131 A1* | 3/2014 | Park | A47L 15/4293 |
| | | | 700/275 |
| 2014/0197934 A1* | 7/2014 | Ha | H04L 12/12 |
| | | | 340/12.5 |
| 2015/0121482 A1* | 4/2015 | Berman | H04L 63/10 |
| | | | 726/5 |

FOREIGN PATENT DOCUMENTS

| | | |
|---|---|---|
| JP | 2011-004424 A | 1/2011 |
| JP | 2012-231260 A | 11/2012 |
| JP | 2013-004004 A | 1/2013 |

OTHER PUBLICATIONS

Office Action dated Sep. 17, 2013 issued in corresponding JP patent application No. 2013-109057 (and partial English translation).

Office Action dated Feb. 7, 2018 issued in corresponding CN patent application No. 201480029567.X (and English translation).

* cited by examiner

| USER AUTHENTICATION INFORMATION || IN-HOME CONTROLLER INFORMATION || ...... |
| USER ID | PASSWORD | CONTROLLER ID | NETWORK ADDRESS | |
| m_kimura | ******* | *********** | ************** | **** |
| ⋮ | ⋮ | ⋮ | ⋮ | ⋮ |

HOME DEVICE, REMOTE CONTROL SYSTEM AND PROGRAM

CROSS REFERENCE TO RELATED APPLICATION

This application is a U.S. national stage of International Patent Application No. PCT/JP2014/063084 filed on May 16, 2014, which claims priority to Japanese Patent Application No. 2013-109057 filed on May 23, 2013, the contents of which are incorporated herein by reference.

TECHNICAL FIELD

The present disclosure relates to technology for remotely controlling electrical devices installed in a home.

BACKGROUND ART

There is known remote control technology that controls multiple electrical devices in a home not only with respective dedicated remote controllers and the like, but also with operations using a portable terminal device.

According to such remote control technology, even if a user is away from home, the user is able to, for example, program the recording of a desired television program in a recorder at home, control an air conditioner to run in advance, thereby making the interior of the home comfortable for when the user returns home, and the like.

More specifically, in the case of desiring to control a desired electrical device in a home to perform desired operation while away from home, the user operates a terminal device to perform operation input with respect to the electrical device. Data corresponding to the operation content (operation data) is transmitted from the terminal device, and passes through an external server to arrive at a controller in the home (in-home controller). Subsequently, the electrical device to be operated is controlled by the in-home controller according to the content indicated by the operation data.

The above external server is, for example, a server computer installed by the manufacturer selling the in-home controller. The external server provides the user with a remote operation service from outside the home as above, and thus stores user information including authentication information of the user (such as a user ID and a password), and information for communicating with the in-home controller (such as a controller ID and a network address).

Conventionally, in remote operation services of this type, when an in-home controller is newly installed, the user is required to access the external server via the terminal device and perform user registration in advance. At this time, the user is required to input the above user authentication information, as well as the controller ID. The controller ID is an identification (ID) preassigned to the in-home controller by the manufacturer, and is used to uniquely identify the in-home controller, and additionally, determine that the in-home controller is a genuine product. Examples of the controller ID include a manufacturing number, serial number, and the like.

The above controller ID is printed on a sticker or the like affixed to the casing surface of the in-home controller. Because the user is required to visually confirm and read the controller ID first, and furthermore because a controller ID of this type often has many digits, there is a problem in that the input work is burdensome.

To address this problem, Patent Literature 1, for example, proposes technology for registering the controller ID to an external server, without requiring input from the user, when replacing the in-home controller. With this technology, the controller ID is stored in advance in a storage provided in the in-home controller. The procedure for registering a controller ID to an external server proposed in Patent Literature 1 will be briefly described below.

First, the user accesses the external server via the terminal device, and gives an instruction for an in-home controller replacement process. Subsequently, the user operates and controls the in-home controller to transmit a replacement execution message containing the controller ID to the external server.

If the external server receives the replacement execution message from the in-home controller within a predetermined time since receiving the above instruction for the replacement process, the external server updates a customer database by newly assigning the controller ID included in the received replacement execution message to the user.

CITATION LIST

Patent Literature

Patent Literature 1: Unexamined Japanese Patent Application Kokai Publication No. 2007-304683

SUMMARY OF INVENTION

Technical Problem

In the proposed technology of Patent Literature 1 above, since the user is not required to input the controller ID, operations via the terminal device are simplified, and in addition, input mistakes may also be prevented. However, the above technology requires the user to operate not only the terminal device, but also the in-home controller. Also, the above technology relates to a process performed in replacement of the in-home controller, and does not discuss any kind of measures regarding new registration of a controller ID during new user registration in the external server.

Given the above, regarding user information managed by an external server, a new proposal related to technology for simplifying user operations related to the registration and update of the controller ID is desired currently.

The present disclosure has been made to solve the above problems of the related art, and an object of the present disclosure is to provide an in-home device, a remote control system, and a program enabling an ID of an in-home device, such as an in-home controller, to be registered or the like to an external server, without requiring a special operation by the user.

Solution to Problem

To achieve the above objective, an in-home device according to the present disclosure includes:

a first communicator configured to communicate with a terminal device;

a second communicator configured to communicate with a server located outside a home;

a manager registry configured to accept a manager registration operation by a user via the terminal device and perform a manager registration based on information inputted by the user during the manager registration operation;

a registration request data generator configured to generate user registration request data containing information included in the information inputted by the user and a preliminarily held device identification of the in-home device; and a registration request data transmitter configured to transmit the user registration request data to the server via the second communicator, wherein when the manager registration operation is accepted and the second communicator and the server are in a non-communicative state with each other, the registration request data transmitter does not transmit the user registration request data to the server, and then, upon the non-communicative state changing to a communicative state, the registration request data transmitter transmits the user registration request data to the server.

Advantageous Effects of Invention

The present disclosure enables registration of an ID of an in-home device or the like to an external server, without requiring a special operation by the user.

DESCRIPTION OF EMBODIMENTS

Hereinafter, an embodiment of the present disclosure will be described in detail with reference to the drawings.

Figure 1:
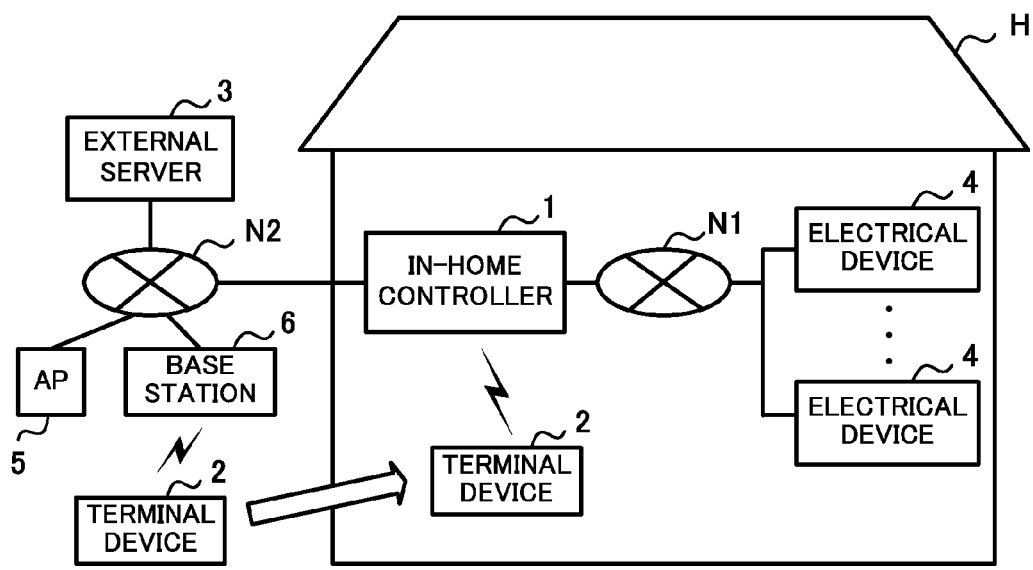
FIG. 1 is a diagram illustrating an overall configuration of a remote control system according to an embodiment of the present disclosure.

FIG. 1 is a diagram illustrating an overall configuration of a remote control system according to an embodiment of the present disclosure. The remote control system is a system for remotely controlling, inside and outside a home H (in home and outside home), electrical devices 4 used by a general household, and is configured to include an in-home controller 1, a terminal device 2, and an external server 3.

The electrical devices 4 are, for example, a television, a DVD recorder, an air purifier, an air conditioner, a dishwasher, a rice cooker, an induction heating (IH) cooker, a water heater, and the like. Each electrical device 4 is communicatively connected in a wired or wireless manner to an in-home network N1 constructed inside the home H, by a built-in communication interface (not illustrated). The in-home network N1 is a network conforming to ECHONET Lite, for example. Note that each electrical device 4 may be connected to the in-home network N1 via an externally attached communication adapter (not illustrated).

Figure 2:
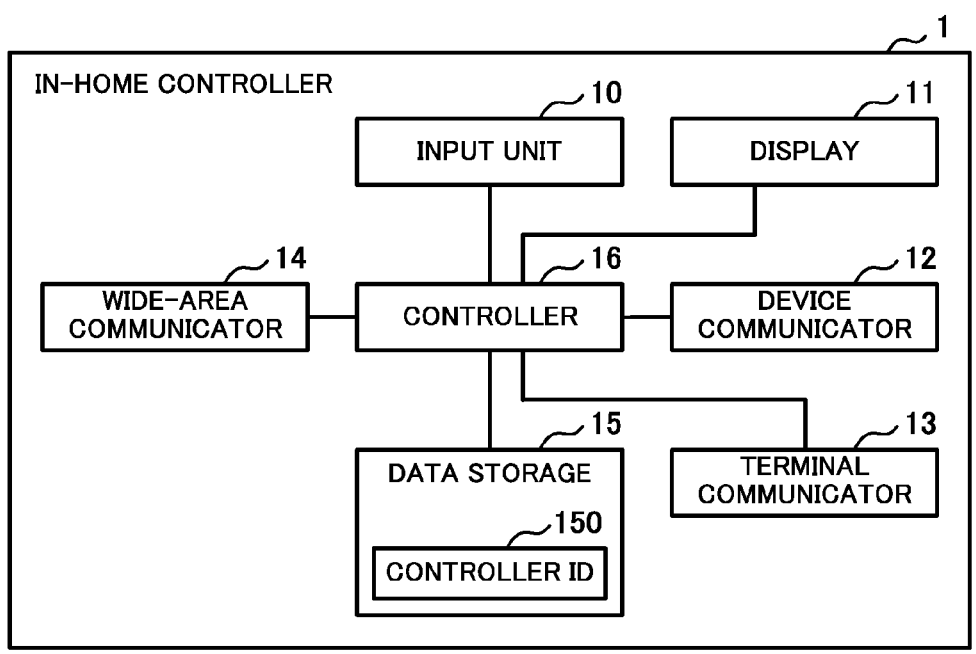
FIG. 2 is a block diagram illustrating a configuration of an in-home controller.

The in-home controller 1 is a concrete example of an in-home device according to the present disclosure. The in-home controller 1 is installed in a suitable location inside the home H, and as illustrated in FIG. 2, the in-home controller 1 is equipped with an input unit 10, a display 11, a device communicator 12, a terminal communicator 13, a wide-area communicator 14, a data storage 15, and a controller 16.

The input unit 10 is configured to include an input device, such as a keyboard, a mouse, a keypad, a touch panel or a touch pad, and performs a process of accepting operation input from a user. The display 11 is configured to include a display device, such as a liquid crystal display panel. Under control by the controller 16, the display 11 displays a monitoring screen indicating the operational state of each electrical device 4, the amount of power consumed in home, and the like, and displays various screens for user operation.

The device communicator 12 is configured to include a communication interface, such as a LAN card. The device communicator 12 communicatively connects to the in-home network N1 in a wired or wireless manner, and under control by the controller 16, performs data communication with each electrical device 4 over the in-home network N1. The terminal communicator 13 (first communicator) is configured to include a predetermined short-range wireless communication interface, and under control by the controller 16, performs data communication conforming to an established wireless LAN standard, such as Wi-Fi (registered trademark), with the terminal device 2.

The wide-area communicator 14 (second communicator) is configured to include a predetermined wide-area communication interface, and performs data communication with the external server 3 over a wide-area network N2, such as the Internet. The data storage 15 assumes the role of what is called a secondary storage device (auxiliary storage device), and comprises a readable and writable non-volatile semiconductor memory or the like, such as a flash memory. Although not illustrated, the data storage 15 stores various programs, including a program for a manager registration process as discussed below, a program for monitoring the amount of power consumed in home, and a program for controlling the operation of each electrical device 4, various data used during the execution of each program, and the like.

Also, the data storage 15 preliminarily stores a controller ID 150, which is an identification (ID) preassigned to the in-home controller 1 by the manufacturer or the like. The controller ID 150 is multi-digit information combining letters, numbers, symbols, and the like as appropriate. The controller ID 150 is information for enabling the in-home controller 1 to be distinguished from among other products of the same type, and is also information indicating that the in-home controller 1 is a genuine product of the manufacturer. The controller ID 150 may be a manufacturing number, a serial number, or the like.

The controller 16 is configured to include a central processing unit (CPU), read-only memory (ROM), random access memory (RAM), and the like (none illustrated), and performs overall control of the in-home controller 1. For example, upon receiving control request data related to control of an electrical device 4 from the terminal device 2, the controller 16 controls the electrical device 4 in accordance with the content of the control request data. Functions of the controller 16 that are unique to the present disclosure will be discussed below.

Figure 3:
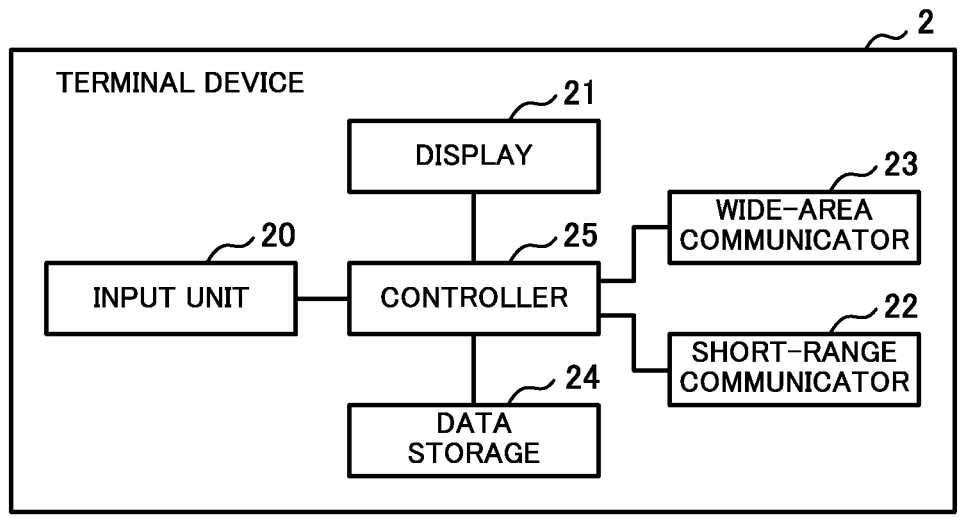
FIG. 3 is a block diagram illustrating a configuration of a terminal device.

Referring back to FIG. 1, the terminal device 2 is a portable device, such as a tablet personal computer or a smartphone. As illustrated in FIG. 3, the terminal device 2 is equipped with an input unit 20, a display 21, a short-range communicator 22, a wide-area communicator 23, a data storage 24, and a controller 25. The input unit 20 comprises a touch panel, touch pad, or the like, and performs a process of accepting operation input from the user. The display 21 comprises a liquid crystal display panel or the like, and under control by the controller 25, displays various screens and the like corresponding to user operations.

The short-range communicator 22 is configured to include a predetermined short-range wireless communication interface. In home, the short-range communicator 22 performs data communication conforming to an established wireless LAN standard, such as Wi-Fi (registered trademark), with the in-home controller 1. Also, outside home, the short-range communicator 22 connects to the wide-area network N2, such as the Internet, via an access point (AP) 5, and performs data communication with the external server 3 and the like.

The wide-area communicator 23 is configured to include a predetermined wide-area wireless communication interface. The wide-area communicator 23 connects to the wide-area network N2, such as the Internet, via a base station 6, and performs data communication with the external server 3 and the like.

The data storage 24 assumes the role of a secondary storage device (auxiliary storage device), and comprises a readable and writable non-volatile semiconductor memory or the like, such as a flash memory. The data storage 24 stores various programs, including a program for remote operation, various data used during the execution of each program, and the like.

The controller 25 is configured to include a CPU, ROM, RAM, and the like, although none are illustrated, and performs overall control of the terminal device 2.

Figure 4:
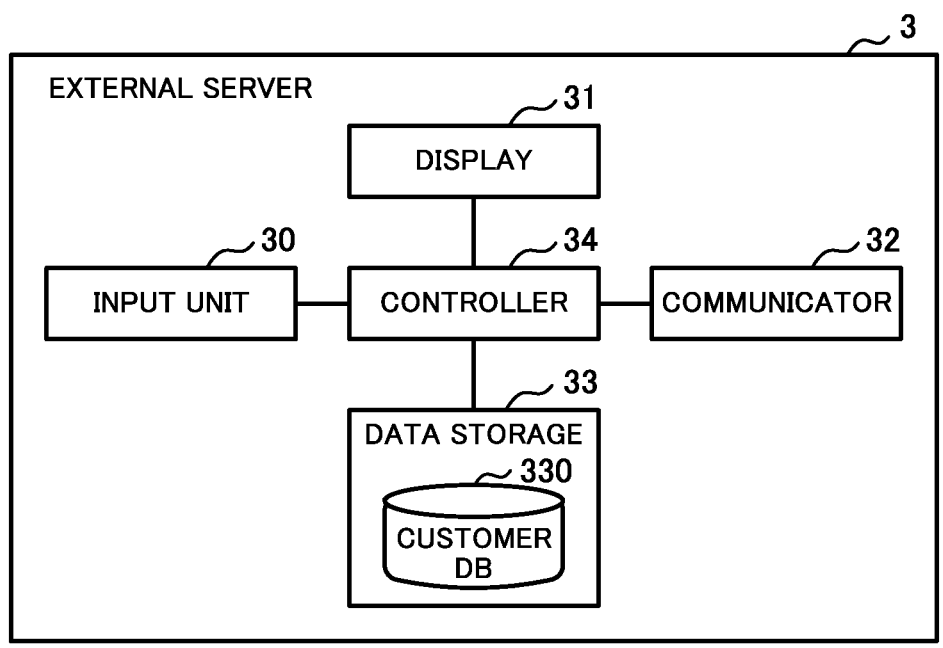
FIG. 4 is a block diagram illustrating a configuration of an external server.

Referring back to FIG. 1, the external server 3 is, for example, a server computer installed by the manufacturer selling the in-home controller 1 or the like, and has functions of a typical web server. As illustrated in FIG. 4, the external server 3 is equipped with an input unit 30, a display 31, a communicator 32, a data storage 33, and a controller 34. The input unit 30 is configured to include an input device, such as a keyboard, a mouse, a keypad, a touch pad or a touch panel, and performs a process of accepting operation input from a user. The display 31 is configured to include a display device, such as a liquid crystal display panel or an organic light-emitting diode (OLED) display panel, and displays text data and image data supplied by the controller 34.

The communicator 32 is configured to include a predetermined wide-area communication interface, and performs data communication with the terminal device 2 and the in-home controller 1 over the wide-area network N2, such as the Internet.

Figures 5, 6:
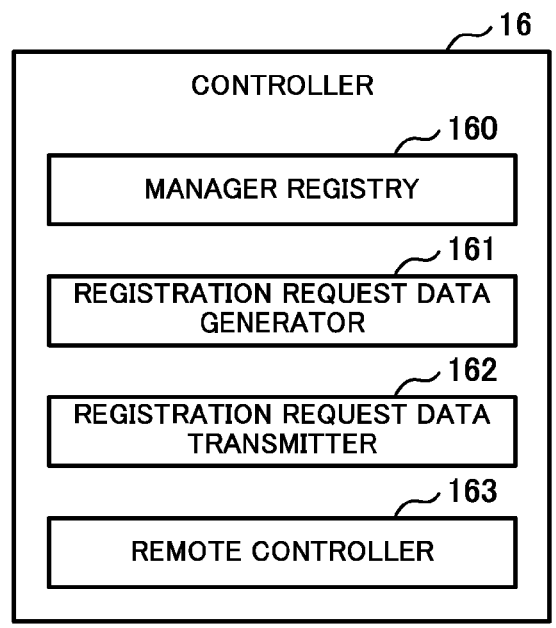
FIG. 5 is a diagram illustrating a configuration of a customer database.
FIG. 6 is a diagram illustrating a functional configuration of a controller provided in an in-home controller.

The data storage 33 assumes the role of a secondary storage device (auxiliary storage device), and comprises a readable and writable non-volatile semiconductor memory, such as a flash memory, or a hard disk drive or the like. In the data storage 33, a customer database (customer DB) 330 is constructed. The customer DB 330 is a database for managing information about users to whom the remote control service is provided. As illustrated in FIG. 5, in the customer DB 330, customer information including user authentication information (user ID, password), in-home controller information (controller ID, network address), and the like are registered per customer (user).

Additionally, the data storage 33 stores various programs for controlling the controller 34 to realize various functions of the external server 3, various data used during the execution of each program, and the like.

The controller 34 is configured to include a CPU, ROM, RAM, and the like, and performs overall control of the external server 3.

The remote control system of the present embodiment enables registration of the controller ID 150 of the in-home controller 1 to the external server 3, without requiring a special operation by the user. Hereinafter, this technique will be described in detail.

As illustrated in FIG. 6, the controller 16 of the in-home controller 1 includes, as functions unique to the present disclosure, a manager registry 160, a registration request data generator 161, a registration request data transmitter 162, and a remote controller 163. The functions of these components are realized by a CPU or the like by executing a program and the like for a manager registration process stored in the data storage 15.

The manager registry 160 accepts a manager registration operation by a user via the terminal device 2, and performs a manager registration based on information inputted by the user during the manager registration operation. Generally, in new installation or replacement of a controller that controls the operation of various electrical devices installed in home, like the in-home controller 1 of the present embodiment, it is presupposed that a manager registration is conducted by the user to enable usage of the controller. In other words, unless the manager registration is completed, the user is unable to monitor the operational state of the electrical devices 4 via the in-home controller 1, or control the electrical devices 4 to perform desired operation.

If data communication with the external server 3 is available, the registration request data generator 161 generates user registration request data containing information inputted by the user during the above manager registration operation (user ID, password), and the controller ID 150 stored in the data storage 15. The registration request data transmitter 162 transmits, to the external server 3 via the wide-area communicator 14, user registration request data generated by the registration request data generator 161. The remote controller 163 (device controller), on a condition of the manager registration being completed, upon receiving control request data from the terminal device 2, controls a specified electrical device 4 according to the content of the control request data.

Figure 7:
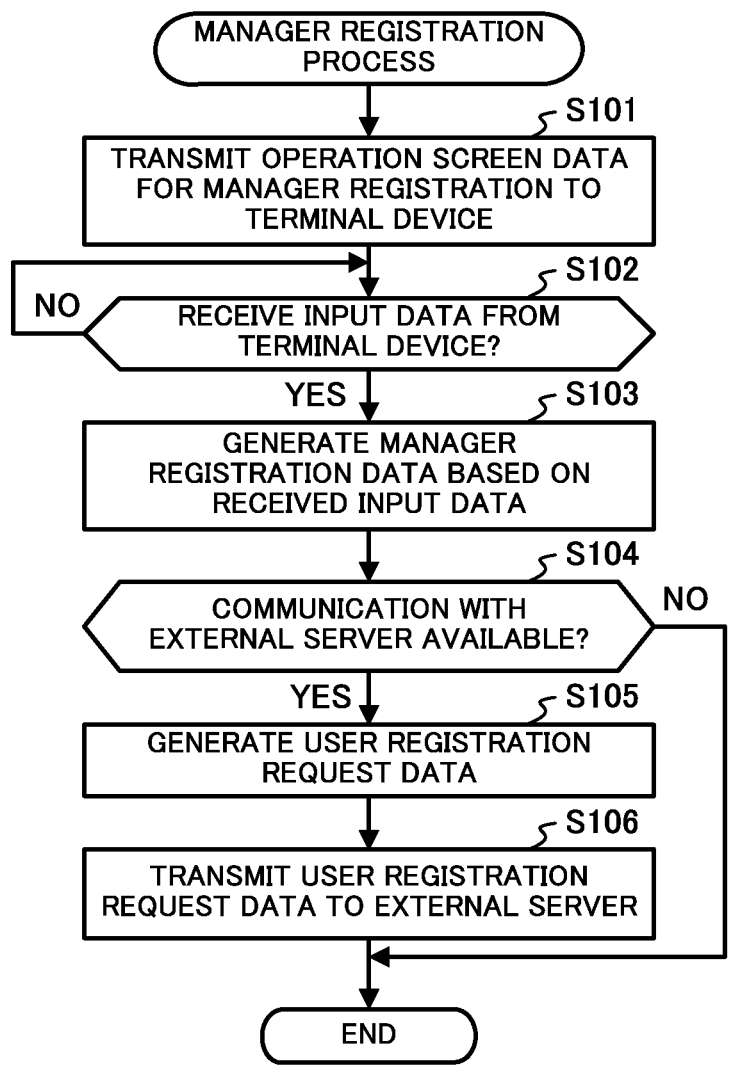
FIG. 7 is a flowchart illustrating a procedure of a manager registration process.

FIG. 7 is a flowchart illustrating steps of a manager registration process executed by the controller 16 of the in-home controller 1. As discussed above, when newly installing the in-home controller 1 in the home H, or when replacing the in-home controller 1, the user is first required to perform manager registration with respect to such in-home controller 1.

The user operates the terminal device 2 at home (that is, inside the home H), and accesses the in-home controller 1. Subsequently, the controller 16 (manager registry 160) of the in-home controller 1 transmits operation screen data for manager registration to the terminal device 2 via the terminal communicator 13 (step S101).

The display 21 of the terminal device 2 displays an operation screen based on the received operation screen data. The user inputs required information according to input items provided on the displayed operation screen. The input items in this case include an item for input of a manager (user) ID (user ID), and an item for input of a password. Upon completion of input by the user, the controller 25 of the terminal device 2 transmits data including the inputted information (input data) to the in-home controller 1 via the short-range communicator 22.

Upon receiving input data from the terminal device 2 via the terminal communicator 13 (step S102; YES), the manager registry 160 generates data for manager registration (manager registration data) based on such input data, and stores the manager registration data in the data storage 15 (step S103). Thus, manager registration is completed.

Next, the controller 16 (registration request data generator 161) determines whether or not the wide-area communicator 14 and the external server 3 are in a communicative state with each other (step S104). If determining that the wide-area communicator 14 and the external server 3 are in a non-communicative state with each other (step S104; NO), the controller 16 ends the manager registration process.

On the other hand, if the wide-area communicator 14 and the external server 3 are in a communicative state (step S104; YES), the registration request data generator 161 generates data for requesting user registration to the external server 3 (user registration request data) (step S105). The user registration request data contains the user ID and password extracted from the received input data, and the controller ID 150 read from the data storage 15. The controller 16 (registration request data transmitter 162) transmits, to the external server 3 via the wide-area communicator 14, the user registration request data generated by the registration request data generator 161 (step S106). At this point, the user registration request data is encrypted and transmitted by Secure Sockets Layer (SSL) or the like.

Upon receiving the user registration request data from the in-home controller 1 via the communicator 32, the controller 34 of the external server 3 extracts the controller ID 150 from such user registration request data. The controller 34 then analyzes the extracted controller ID 150, and determines whether or not the in-home controller 1 from which the request originated is a genuine product. If determining that the in-home controller 1 is a non-genuine product, the controller 34 transmits, to the in-home controller 1 via the communicator 32, error response data indicating that the user registration request data is unacceptable.

On the other hand, if determining that the in-home controller 1 is a genuine product, the controller 34 extracts the user ID and password from the received user registration request data, and uses the extracted user ID and password as a key to search the customer DB 330. Then, if a record of customer information matching the extracted user ID and password is not detected, the controller 34 performs a process of newly registering customer information for the user. In other words, the controller 34 generates, and additionally registers in the customer DB 330, a record of customer information containing the user ID, password, and controller ID 150 extracted from the received user registration request data, and the network address of the transmission origin of the user registration request data (that is, the in-home controller 1).

On the other hand, if a record of customer information matching the user ID and password included in the received user registration request data is detected, the controller 34 determines that the in-home controller 1 has been replaced, and performs a process of updating the registration of customer information for the user. In other words, the controller 34 uses the controller ID 150 extracted from the received user registration request data and the network address of the transmission origin of the user registration request data to update the content of the "in-home controller information" in the record of the customer information corresponding to the user.

Figure 8:
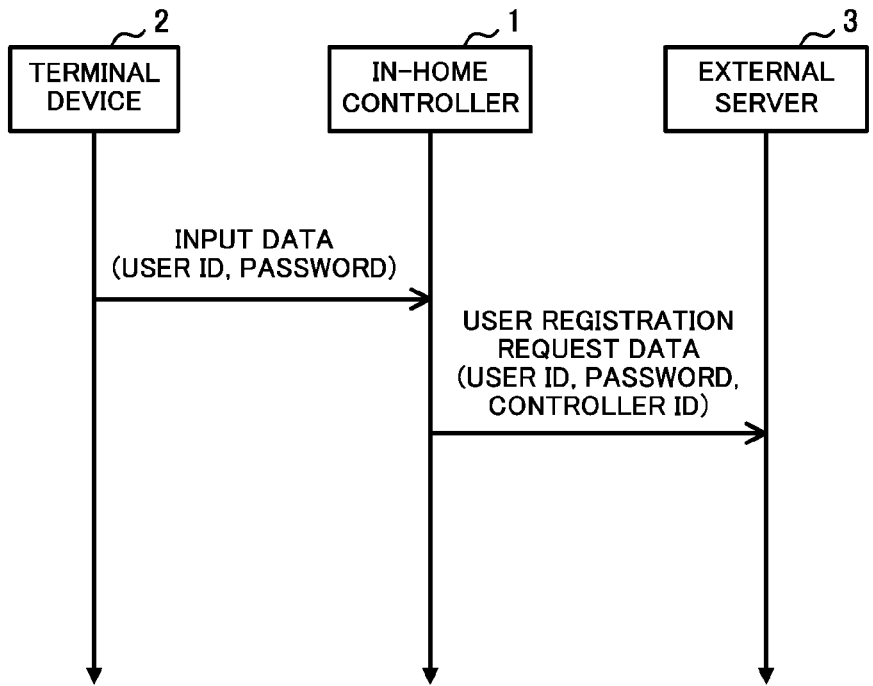
FIG. 8 is a sequence diagram illustrating a flow of data between devices in a manager registration process.

The flow of data among the devices (the terminal device 2, the in-home controller 1, and the external server 3) in the above manager registration process is illustrated in FIG. 8.

Note that during the manager registration process, if the in-home controller 1 and the external server 3 are in a non-communicative state with each other (the case of NO in step S104 of FIG. 7), but the non-communicative state later changes to a communicative state, the in-home controller 1 transmits the user registration request data to the external server 3. Specifically, upon the non-communicative state between the wide-area communicator 14 and the external server 3 changing to a communicative state, the registration request data generator 161 generates user registration request data based on the manager registration data stored in the data storage 15. Subsequently, the registration request data transmitter 162 transmits, to the external server 3 via the wide-area communicator 14, the user registration request data generated by the registration request data generator 161.

As described above, according to a remote control system of the present embodiment, when the in-home controller 1 is newly installed in the home H, or when the in-home controller 1 is replaced, the user may simply perform manager registration (such as registration of a user ID and password) on the in-home controller 1 via the terminal device 2, thereby causing the external server 3 to perform a new user registration, or update the registered content in conjunction with the replacement of the in-home controller 1.

Consequently, the user is not required to input the controller ID 150, and the user operation for using the external server 3 is significantly simplified as compared to the past.

In addition, the in-home controller 1 transmits user registration request data containing the controller ID 150 held in the in-home controller 1 itself to the external server 3, and the external server 3 registers the controller ID 150 included in the received user registration request data. For this reason, a situation in which the controller ID of another in-home controller is incorrectly registered can be prevented, and unauthorized registration can also be prevented.

Note that the present disclosure is not limited to the foregoing embodiment, and various modifications are obviously possible within a scope that does not depart from the spirit of the present invention.

Figure 9:
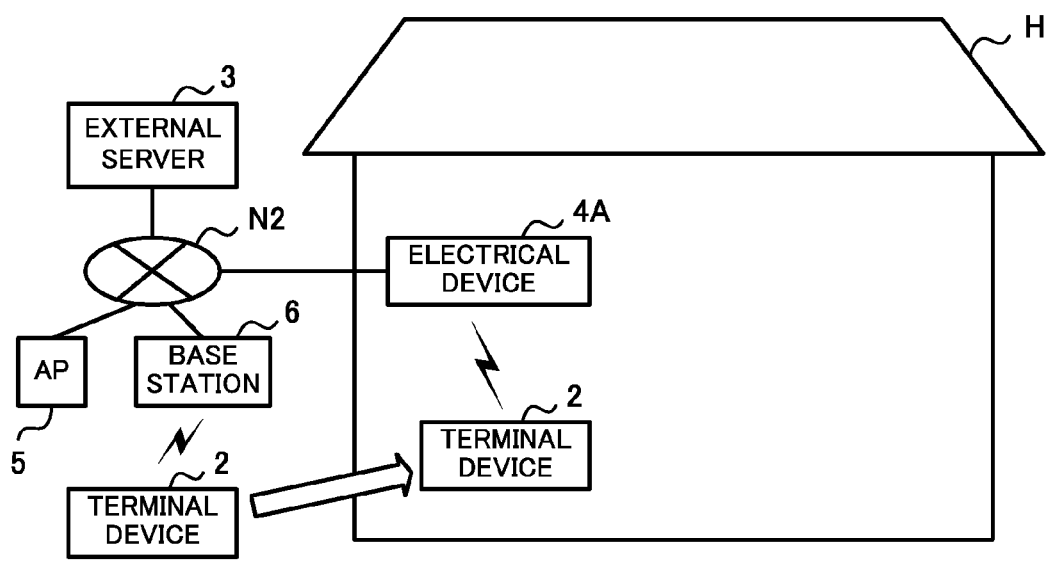
FIG. 9 is a diagram illustrating an overall configuration of a remote control system according to another embodiment of the present disclosure.

For example, the in-home device of the present disclosure is not limited to a controller that controls multiple electrical devices in home, like the in-home controller 1 of the foregoing embodiment. For example, as illustrated in FIG. 9, the present disclosure may also be applied to an electrical device 4A equipped with a communication interface that wirelessly communicates with the terminal device 2, and a communication interface that connects to the wide-area network N2 to communicate with the external server 3.

Also, in the foregoing embodiment, a program executed by the in-home controller 1 may also be stored and distributed on a non-transitory computer-readable recording medium, such as a Compact Disc-Read-Only Memory (CD-ROM), a Digital Versatile Disc (DVD), a magneto-optical (MO) disc, a USB memory, or a memory card. Additionally, installation of such a program onto a specific or general-purpose computer enables such computer to function as the in-home controller 1.

Also, the above program may be stored in a disk device or the like included in a server device on a communication network such as the Internet, in which the program is modulated onto a carrier wave and downloaded or the like to a computer, for example.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2013-109057, filed on May 23, 2013, the entire disclosure of which is incorporated by reference herein.

INDUSTRIAL APPLICABILITY

The present disclosure may be advantageously applied to a system or the like that remotely controls electrical devices or the like used in a general household.

REFERENCE SIGNS LIST

1 In-home controller
2 Terminal device
3 External server
4, 4A Electrical device
5 AP
6 Base station
10, 20, 30 Input unit
11, 21, 31 Display
12 Device communicator
13 Terminal communicator
14, 23 Wide-area communicator
15, 24, 33 Data storage
16, 25, 34 Controller
22 Short-range communicator
32 Communicator
150 Controller ID
160 Manager registry
161 Registration request data generator
162 Registration request data transmitter
163 Remote controller
330 Customer DB
N1 In-home network
N2 Wide-area network

The invention claimed is:

1. An in-home controller for use in a home, the in-home controller comprising:
  a first communicator configured to communicate with a terminal device;
  a second communicator configured to communicate with a server located outside the home;
  a manager registry configured to accept a manager registration operation by a user via the terminal device and perform a manager registration based on information inputted by the user during the manager registration operation;
  a data transmitter configured to, when the manager registration operation is accepted,
    determine whether the second communicator and the server are in a communicative state with each other;
    if the second communicator and the server are determined to be in the communicative state with each other, transmit data to the server via the second communicator, the data containing (i) information included in the information inputted by the user and (ii) a controller identification of the in-home controller, and
    if the second communicator and the server are determined to be in a non-communicative state with each other, not transmit the data to the server via the second communicator, and thereafter upon the non-communicative state changing to the communicative state, transmit the data to the server via the second communicator; and
  a device controller, the device controller is configured to
    when the manager registration is completed by the manager registry, upon the device controller receiving, from the terminal device, control request data related to control of an electrical device installed in the home,
    control the electrical device according to content of the control request data.

2. The in-home controller according to claim 1, wherein the information inputted by the user during the manager registration includes a user identification and a password.

3. The in-home controller according to claim 1, wherein
  the first communicator communicates with the terminal device using short-range communication during the manager registry accepting the manager registration operation by a user; and
  the second communicator communicates with the server using wide-area communication.

4. A remote control system comprising an in-home controller for use in a home, a terminal device, and a server located outside the home,
  the in-home controller comprising:
    a first communicator configured to communicate with the terminal device;
    a second communicator configured to communicate with the server;
    a manager registry configured to accept a manager registration operation by a user via the terminal device and perform a manager registration based on information inputted by the user during the manager registration operation;
    a data transmitter configured to, when the manager registration operation is accepted,
      determine whether the second communicator and the server are in a communicative state with each other;
      if the second communicator and the server are determined to be in the communicative state with each other, transmit data to the server via the second communicator, the data containing (i) information included in the information inputted by the user and (ii) a controller identification of the in-home controller, and
      if the second communicator and the server are determined to be in a non-communicative state with each other, not transmit the data to the server via the second communicator, and thereafter upon the non-communicative state changing to the communicative state, transmit the data to the server via the second communicator; and
    a device controller configured to
      when the manager registration is completed by the manager registry, upon the device controller receiving, from the terminal device, control request data related to control of an electrical device installed in the home, control the electrical device according to content of the control request data, the server comprising:

a third communicator configured to communicate with the in-home controller and the terminal device;

a database in which customer information is registered; and a server controller configured to update, upon receiving the data from the in-home controller via the third communicator, the database based on content of the received data.

5. The remote control system according to claim 4, wherein, in the server, the customer information registered in the database includes a user identification, a password and an identification of the in-home controller, and the server controller is configured to search the database for relevant customer information using the user identification and the password extracted from the data, when the relevant customer information exists in the database, to update the identification of the in-home controller included in the customer information to the controller identification extracted from the data, and when the relevant customer information does not exist in the database, to register, in the database, customer information newly generated based on the content of the data.

6. The remote control system according to claim 4, wherein the first communicator communicates with the terminal device using short-range communication during the manager registry accepting the manager registration operation by a user; and the second communicator communicates with the server using wide-area communication.

7. A non-transitory computer-readable recording medium having stored thereof a program that causes a computer, including a communication interface for communicating with a sever located outside a home, to function as:

a manager registry configured to accept a manager registration operation by a user via a terminal device and perform a manager registration based on information inputted by the user during the manager registration operation; and a data transmitter configured to, when the manager registration operation is accepted, determine whether the communication interface and the server are in a communicative state with each other;

if the communication interface and the server are determined to be in the communicative state with each other, transmit data to the server via the communication interface, the data containing (i) information included in the information inputted by the user and (ii) a controller identification of itself, if the communication interface and the server are determine to be in a non-communicative state with each other, not transmit the data to the server via the communication interface, and thereafter upon the non-communicative state changing to the communicative state, transmit the data to the server via the communication interface; and a device controller configured to when the manager registration is completed by the manager registry, upon the device controller receiving, from the terminal device, control request data related to control of an electrical device installed in the home, control the electrical device according to content of the control request data.

8. The non-transitory computer-readable recording medium according to claim 7, wherein the communication interface communicates with the server using wide-area communication.

* * * * *